US009927035B2

(12) United States Patent
Alexander et al.

(10) Patent No.: US 9,927,035 B2
(45) Date of Patent: Mar. 27, 2018

(54) VALVE MANIFOLD, WASHER SYSTEM, AND DEVICE

(71) Applicants: GM GLOBAL TECHNOLOGY OPERATIONS LLC, Detroit, MI (US); DYNALLOY, Inc., Tustin, CA (US)

(72) Inventors: Paul W. Alexander, Ypsilanti, MI (US); Nancy L. Johnson, Northville, MI (US); James Holbrook Brown, Temecula, CA (US); Tyler P. Ownby, Huntington Beach, CA (US); Brian W. Bowling, San Dimas, CA (US)

(73) Assignees: GM Global Technology Operations LLC, Detroit, MI (US); Dynalloy, Inc., Tustin, CA (US)

( * ) Notice: Subject to any disclaimer, the term of this patent is extended or adjusted under 35 U.S.C. 154(b) by 205 days.

(21) Appl. No.: 14/995,798

(22) Filed: Jan. 14, 2016

(65) Prior Publication Data
US 2016/0207075 A1   Jul. 21, 2016

Related U.S. Application Data

(60) Provisional application No. 62/103,810, filed on Jan. 15, 2015.

(51) Int. Cl.
*A62C 31/00* (2006.01)
*F16K 1/32* (2006.01)
(Continued)

(52) U.S. Cl.
CPC .................. *F16K 1/32* (2013.01); *B05B 1/00* (2013.01); *B05B 1/1627* (2013.01);
(Continued)

(58) Field of Classification Search
CPC . F16K 1/32; F16K 11/18; F16K 11/22; F16K 27/003; F16K 31/025; B05B 1/00;
(Continued)

(56) References Cited

U.S. PATENT DOCUMENTS

| | | | | | |
|---|---|---|---|---|---|
| 4,834,143 | A | * | 5/1989 | Bayat | .................... A01G 25/162<br>137/883 |
| 6,036,107 | A | * | 3/2000 | Aspen | ................. A01M 7/0089<br>137/883 |

(Continued)

*Primary Examiner* — Steven J Ganey
(74) *Attorney, Agent, or Firm* — Quinn IP Law

(57) ABSTRACT

A valve manifold includes a housing defining an inlet port and a plurality of outlet ports. Each of the plurality of outlet ports defines a sealing face. The manifold also includes a plurality of poppets, wherein each of the plurality of poppets is disposed within a respective one of the plurality of outlet ports and is configured for translating towards and away from the sealing face. The manifold also includes a plurality of actuators each configured for translating a respective one of the plurality of poppets towards and away from the sealing face, wherein each of the plurality of actuators is formed from a shape memory alloy transitionable between a first state and a second state in response to a thermal activation signal. A washer system, a device, and a method of simultaneously controlling fluid flow to a first component and a second component of the device are also disclosed.

16 Claims, 2 Drawing Sheets

(51) Int. Cl.
  *B05B 1/16*  (2006.01)
  *B05B 1/20*  (2006.01)
  *B05B 1/32*  (2006.01)
  *B05B 1/30*  (2006.01)
  *B05B 9/04*  (2006.01)
  *B08B 3/02*  (2006.01)
  *B05B 1/00*  (2006.01)
  *F16K 11/18*  (2006.01)
  *F16K 11/22*  (2006.01)
  *F16K 27/00*  (2006.01)
  *F16K 31/02*  (2006.01)

(52) U.S. Cl.
  CPC .......... *B05B 1/1636* (2013.01); *B05B 1/1645* (2013.01); *B05B 1/1654* (2013.01); *B05B 1/20* (2013.01); *B05B 1/3046* (2013.01); *B05B 1/32* (2013.01); *B05B 9/0423* (2013.01); *B08B 3/02* (2013.01); *F16K 11/18* (2013.01); *F16K 11/22* (2013.01); *F16K 27/003* (2013.01); *F16K 31/025* (2013.01)

(58) Field of Classification Search
  CPC ....... B05B 9/0423; B05B 1/52; B05B 1/1645; B05B 1/1654; B05B 1/1627; B05B 1/1636; B05B 1/20; B05B 1/3046; B08B 3/02
  USPC ..... 239/67, 76, 284.1, 284.2, 349, 437, 438, 239/443, 444, 446, 536, 566, 583; 251/11, 129.06; 137/625.48, 883, 884, 137/885, 887
  See application file for complete search history.

(56) References Cited

U.S. PATENT DOCUMENTS 8,555,926 B2 * 10/2013 MacDuff ............... F24D 3/1066
                                                                 137/883
2012/0240580 A1 * 9/2012 Takemaru ............ F01D 17/145
                                                                 137/883

* cited by examiner

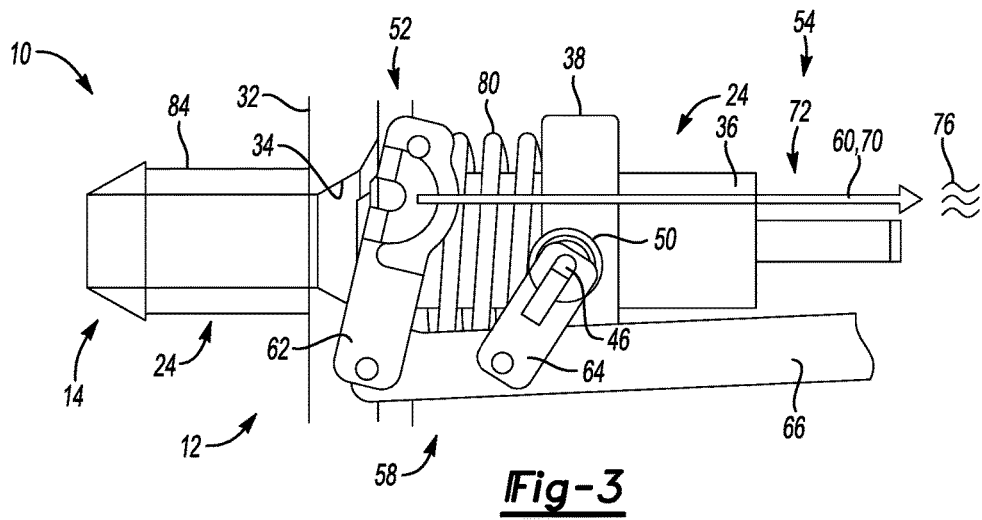
Fig-3
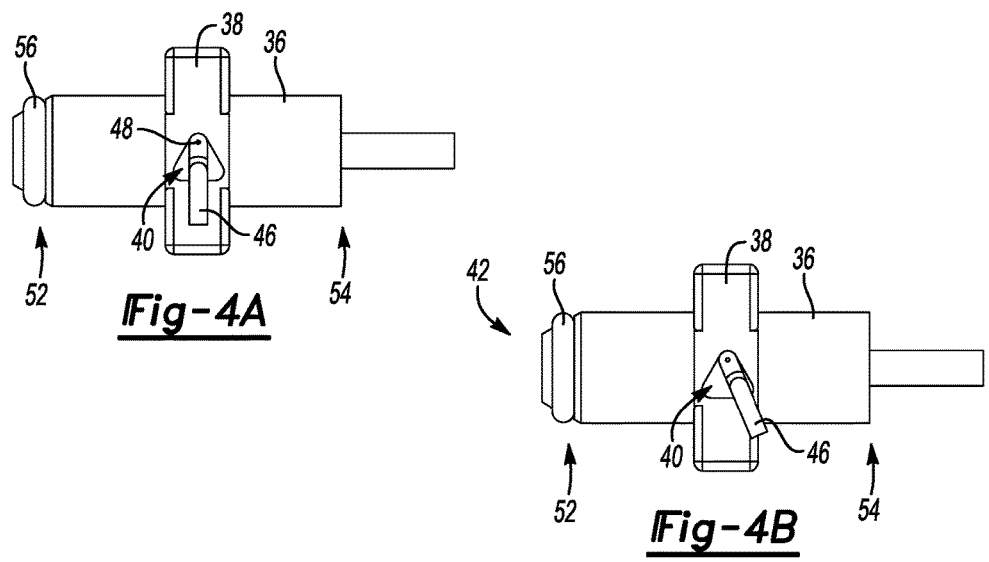
Fig-4A
Fig-4B
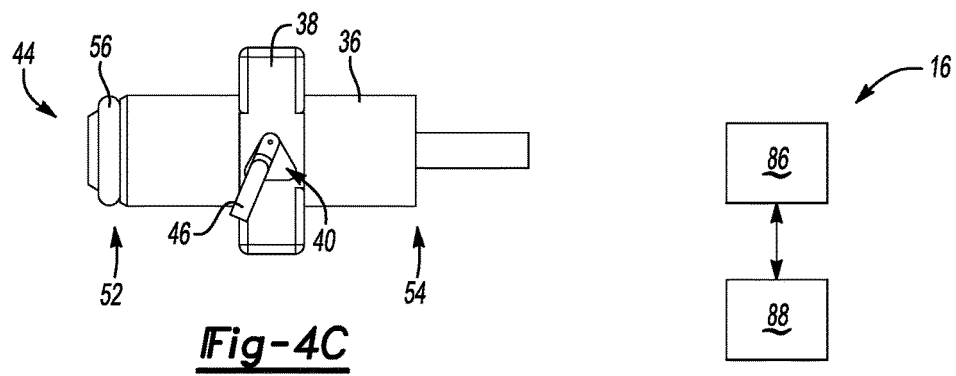
Fig-4C
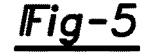
Fig-5

VALVE MANIFOLD, WASHER SYSTEM, AND DEVICE

CROSS-REFERENCE TO RELATED APPLICATIONS

This application claims the benefit of U.S. Provisional Application No. 62/103,810, filed on Jan. 15, 2015, which is hereby incorporated by reference in its entirety.

TECHNICAL FIELD

The disclosure relates to a valve manifold of a washer system for a device.

BACKGROUND

Valves are useful for many applications requiring controlled fluid flow. For example, valves may be used to distribute fluid to portions or components of a device. Such fluid distribution often must be precisely and reliably controlled and/or available on an on-demand basis.

That is, many devices are operated in harsh environments. For example, devices such as vehicles and security cameras may be exposed to dirt, debris, and/or moisture during operation. Such dirt, debris, and/or moisture may be washed away by a fluid that is distributed by one or more valves.

SUMMARY

A valve manifold includes a housing defining an inlet port and a plurality of outlet ports, wherein each of the plurality of outlet ports defines a sealing face. The valve manifold also includes a plurality of poppets, wherein each of the plurality of poppets is disposed within a respective one of the plurality of outlet ports and is configured for translating towards and away from the sealing face. The valve manifold further includes a plurality of actuators each configured for translating a respective one of the plurality of poppets towards and away from the sealing face, wherein each of the plurality of actuators is formed from a shape memory alloy transitionable between a first state and a second state in response to a thermal activation signal.

A washer system includes a reservoir defining a cavity and configured for storing a fluid within the cavity. The washer system also includes the valve manifold and only one pump. The only one pump is configured for transmitting the fluid under pressure from the reservoir to the inlet port.

A device includes a first component and a second component spaced apart from the first component and exposed to debris. The device also includes the washer system configured for both selectively washing only one of the first component and the second component, and for washing both of the first component and the second component simultaneously. Further, the device includes a first nozzle disposed in fluid communication with one of the plurality of outlet ports and configured for spraying the fluid onto the first component. The device also includes a second nozzle disposed in fluid communication with another one of the plurality of outlet ports and configured for spraying the fluid onto the second component.

The above features and advantages and other features and advantages of the present disclosure will be readily apparent from the following detailed description of the preferred embodiments and best modes for carrying out the present disclosure when taken in connection with the accompanying drawings and appended claims.

BRIEF DESCRIPTION OF THE DRAWINGS

FIG. 3 is a schematic illustration of a top, cutaway view of a portion of the valve manifold of FIGS. 1 and 2;

FIG. 4A is a schematic illustration of a side view of a poppet and a pin of the valve manifold of FIGS. 1 and 2, wherein the pin and poppet are disposed in a neutral position;

FIG. 4B is a schematic illustration of a side view of the poppet and pin of FIG. 4B, wherein the pin is rotated and the poppet is disposed in a closed position;

FIG. 4C is a schematic illustration of a side view of the poppet and pin of FIGS. 4A and 4B, wherein the pin is rotated and the poppet is disposed in an open position; and FIG. 5 is a schematic flowchart of a method of simultaneously controlling fluid flow to a first component of the device of FIGS. 1 and 2 and a second component of the device.

DETAILED DESCRIPTION

Figure 1:
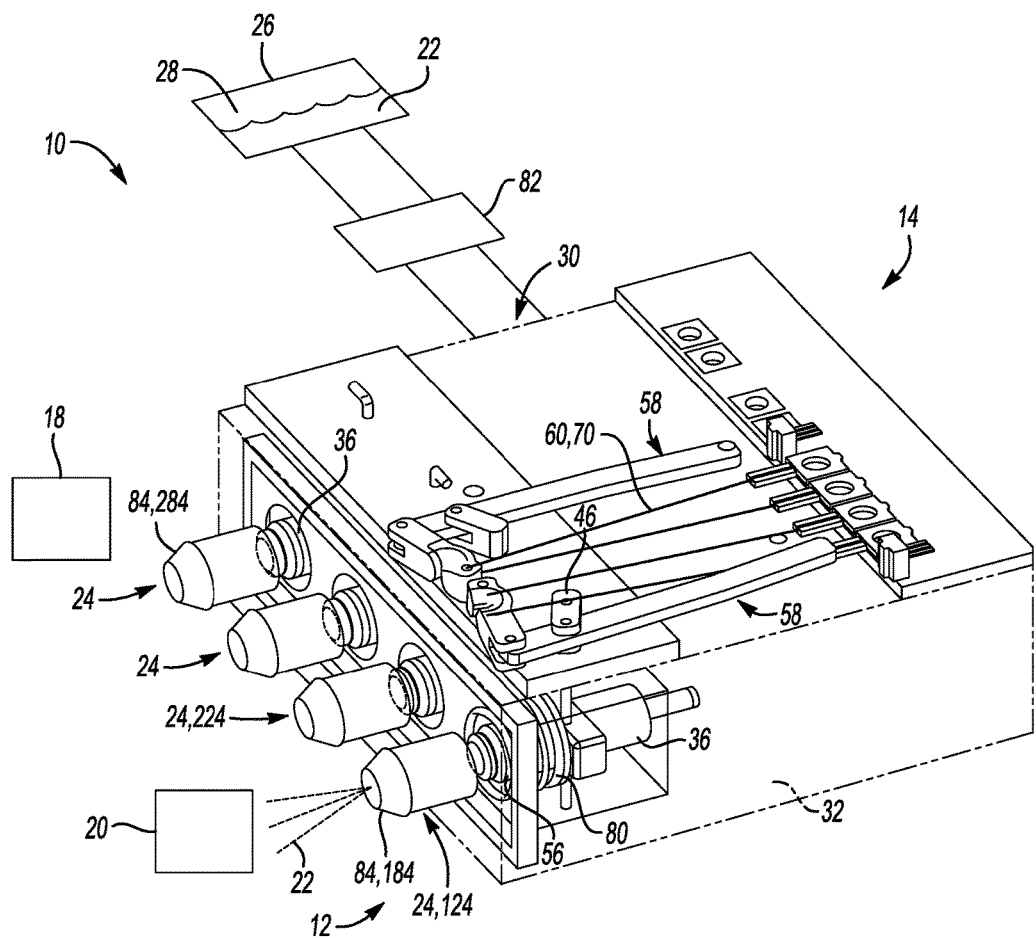
FIG. 1 is a schematic illustration of a perspective view of a valve manifold of a wash system of a device.

Referring to the Figures, wherein like reference numerals refer to like elements, a device 10 including a washer system 12 that includes a valve manifold 14 is shown generally in FIG. 1. A method 16 of simultaneously controlling fluid flow to a first component 18 (FIG. 1) of the device 10 and a second component 20 (FIG. 1) of the device 10 is also shown generally in FIG. 5. The valve manifold 14, washer system 12, and method 16 may be useful for devices 10 which require controlled, precise, reliable, and on-demand fluid distribution to specific portions of the device 10. The valve manifold 14 and washer system 12 may minimize fluid backflow and fluid waste, may accurately seal off unwanted fluid flow to one or more portions of the device 10, and may allow precise and controlled fluid flow to multiple portions of the device 10 simultaneously from a single fluid source and single pump 82 (FIG. 1).

For example, the valve manifold 14 and washer system 12 may be useful for washing only the first component 18 of the device 10 without washing the second component 20. Conversely, the valve manifold 14 and washer system 12 may be useful for washing only the second component 20 of the device 10 without washing the first component 18. Moreover, the valve manifold 14 and washer system 12 may be useful for washing both the first component 18 and the second component 20 of the device 10 simultaneously from a single fluid source. For example, the valve manifold 14 may allow for simultaneous washing of a lens of a camera, i.e., the first component 18, and a rear liftgate window, i.e., a second component 20. Therefore, the valve manifold 14 may be characterized as a diverter valve. As such, the valve manifold 14 and washer system 12 may be useful for vehicular applications such as automotive vehicles, construction equipment, and aviation applications. The valve manifold 14 and washer system 12 may alternatively be useful for non-vehicular applications such as, but not limited to, residential pressurized fluid distribution, recreational and industrial devices, and security camera monitoring.

Referring now to FIG. 1, the device 10 includes the first component 18 and the second component 20 spaced apart from the first component 18. By way of non-limiting examples, the first component 18 and the second component 20 may be any of a rear window, a liftgate window, a camera lens, a front windshield, and the like. The first component 18 and the second component 20 may be exposed to dirt, dust, moisture, and/or debris during operation of the device 10 and therefore may periodically require washing with a fluid 22, such as water or windshield washer fluid comprising a de-icer, bug remover, solvents, and/or detergents. Alternatively, the fluid 22 may be a valve fluid, such as an oil and/or lubricant. As another non-limiting example, the fluid 22 may be a gas, such as nitrogen.

The device 10 also includes a washer system 12 configured for both selectively washing only one of the first component 18 and the second component 20, and for washing both of the first component 18 and the second component 20 simultaneously. That is, the washer system 12 may divert the fluid 22 on an on-demand and configurable basis from the first component 18 to the second component 20 or from the second component 20 to the first component 18. Alternatively, the washer system 12 may divert the fluid 22 on an on-demand basis to both the first component 18 and the second component 20 simultaneously. Importantly, the washer system 12 may minimize fluid waste caused by fluid overflow from a plurality of outlet ports 24, i.e., upon switching from a first outlet port 124 to a second outlet port 224, as set forth in more detail below. That is, the washer system 12 may minimize fluid "burping" or leaking or backflow from the plurality of outlet ports 24 when switching between washing the first component 18 and washing the second component 20 or when additionally washing the second component 20 during washing of the first component 18.

As described with continued reference to FIG. 1, the washer system 12 further includes a reservoir 26 defining a cavity 28 and configured for storing the fluid 22. For example, the reservoir 26 may be a windshield washer fluid tank or a tank configured for storing a valve fluid.

Figure 2:
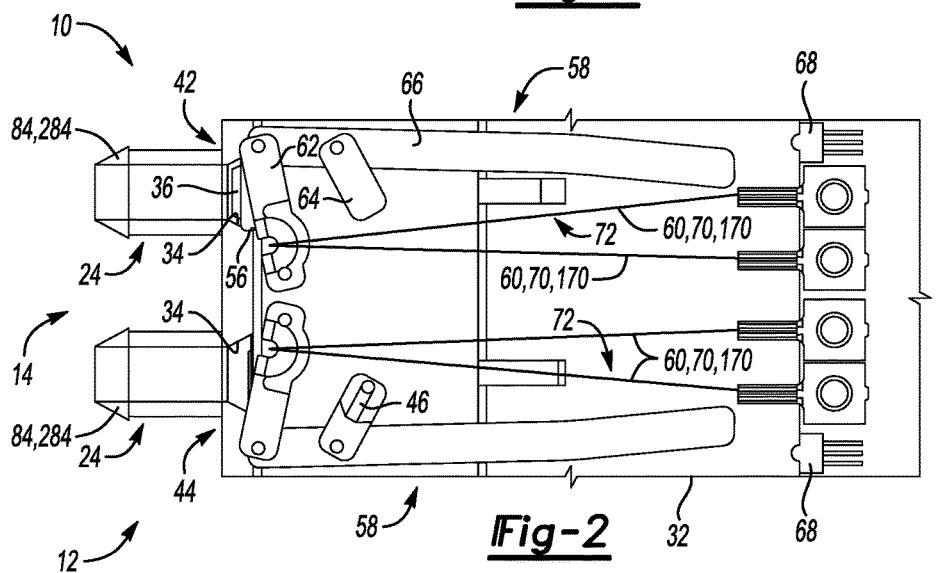
FIG. 2 is a schematic illustration of a top view of a portion of the valve manifold of FIG. 1, wherein one of a plurality of poppets is disposed in a closed position and another one of the plurality of poppets is disposed in an open position.

The washer system 12 also includes a valve manifold 14. The valve manifold 14 may be characterized as a diverter valve and may toggle or switch fluid distribution between an inlet port 30 and the plurality of outlet ports 24. In particular, the valve manifold 14 includes a housing 32 defining the inlet port 30 and the plurality of outlet ports 24, wherein each of the plurality of outlet ports 24 defines a sealing face 34 (FIG. 2). The housing 32 may define any number of outlet ports 24, such as, but not limited to, two, three, four, six, or eight outlet ports 24, depending upon a number of portions or components of the device 10 that require washing with the fluid 22. In one non-limiting embodiment, the valve manifold 14 may include at least four outlet ports 24, e.g., six or eight outlet ports 24. Further, although not shown, the housing 32 may include any number of inlet ports 30. For example, the valve manifold 14 may include three or more outlet ports 24 and/or two or more inlet ports 30.

As best shown in FIGS. 1 and 2, the valve manifold 14 also includes a plurality of poppets 36, wherein each of the plurality of poppets 36 is disposed within a respective one of the plurality of outlet ports 24 and is configured for translating towards and away from the sealing face 34. That is, as described with reference to FIGS. 4A-4C, each of the plurality of poppets 36 may be generally cylindrical, and may include a central shoulder portion 38 defining a cutout 40. The cutout 40 may be, for example, triangular shaped. During operation of the valve manifold 14, each poppet 36 may transition between a closed position 42 (FIGS. 2 and 4B) in which the poppet 36 sealingly abuts the sealing face 34 and an open position 44 (FIGS. 2 and 4C) in which the poppet 36 is spaced apart from the sealing face 34. When the poppet 36 is disposed in the closed position 42, the fluid 22 may not pass through the outlet port 24. Conversely, when the poppet 36 is disposed in the open position 44, the fluid 22 may pass through the outlet port 24. Further, each of the plurality of poppets 36 may translate within the respective one of the plurality of outlet ports 24 with minimal friction and actuation force.

Referring again to FIG. 3, the valve manifold 14 may further include a plurality of pins 46, wherein each of the plurality of pins 46 protrudes from a respective one of the plurality of poppets 36. For example, each of the plurality of pins 46 may be generally L-shaped and include a dog leg that protrudes from each of the plurality of pins 46. Further, each of the plurality of pins 46 may protrude from the housing 32 and may be rotatable with respect to the housing 32 about a pivot point 48 (FIG. 4A).

In addition, the valve manifold 14 may further include a plurality of first o-ring seals 50 each surrounding a respective one of the plurality of pins 46. Each of the plurality of first o-ring seals 50 is configured for sealing the respective one of the plurality of pins 46 against the housing 32 so that fluid 22 within the respective one of the outlet ports 24 may not leak or escape from the cutout 40 along the pin 46. Each of the plurality of first o-ring seals 50 may be formed from an elastomer, such as rubber.

Further, each of the plurality of poppets 36 may have a first end 52 and a second end 54 spaced apart from the first end 52. The valve manifold 14 may further include a plurality of second o-ring seals 56 (FIGS. 4A-4C) each disposed on the first end 52 of a respective one of the plurality of poppets 36 and configured for sealing the first end 52 against the sealing face 34. The plurality of second o-ring seals 56 may also be formed from an elastomer.

Referring to FIGS. 2 and 3, the valve manifold 14 may further include a plurality of linkages 58, wherein each of the plurality of linkages 58 is connected to a respective one of the plurality of pins 46 and a respective one of a plurality of actuators 60. For example, each of the plurality of linkages 58 may be a four-bar linkage and may include an actuator arm 62, a pin arm 64, and a switch arm 66 operatively connected to the actuator arm 62 and the pin arm 64. For example, the actuator arm 62 and the pin arm 64 may each be pivotably connected to the switch arm 66. The switch arm 66 may be configured for interacting with a cut-off switch 68 (FIG. 2), which may be configured as, for example, a piezoelectric switch or as an optical switch. The cut-off switch 68 may operatively communicate with a printed circuit board (not shown) to remove a thermal activation signal 76 (FIG. 3) from a shape memory alloy 70, as set forth in more detail below. For example, the switch arm 66 may translate into position to cover the cut-off switch 68 and interrupt an electronic or optical signal.

Referring now to FIGS. 1-3, the valve manifold 14 also includes a plurality of actuators 60 each configured for translating a respective one of the plurality of poppets 36 towards and away from the sealing face 34. Each of the plurality of actuators 60 is formed from a shape memory alloy 70 transitionable between a first state 72 (FIG. 2) and a second state (not shown) in response to the thermal activation signal 76 (FIG. 3), e.g., heat such as from Joule heating or an electric current passed through resistance, or from an external heat source such as a radiative heating element, a ceramic heating element, and the like. Therefore, as set forth in more detail below, the shape memory alloy 70 may transition between the first state 72 and the second state to translate a respective one of the plurality of poppets 36 towards and away from the sealing face 34, i.e., between the open position 44 (FIGS. 2 and 4C) and the closed position 42 (FIGS. 2 and 4B).

As used herein, the terminology "shape memory alloy 70" refers to alloys that exhibit a shape memory effect and have the capability to quickly change properties in terms of stiffness, spring rate, and/or form stability. That is, the shape memory alloy 70 may undergo a solid state crystallographic phase change via molecular or crystalline rearrangement to shift between a martensite phase, i.e., "martensite", and an austenite phase, i.e., "austenite". That is, the shape memory alloy 70 may undergo a displacive transformation rather than a diffusional transformation to shift between martensite and austenite. A displacive transformation is defined as a structural change that occurs by the coordinated movement of atoms or groups of atoms relative to neighboring atoms or groups of atoms. Further, the martensite phase generally refers to the comparatively lower-temperature phase and is often more deformable than the comparatively higher-temperature austenite phase.

The temperature at which the shape memory alloy 70 begins to change from the austenite phase to the martensite phase is known as the martensite start temperature, $M_s$. The temperature at which the shape memory alloy 70 completes the change from the austenite phase to the martensite phase is known as the martensite finish temperature, $M_f$, or transformation temperature, $T_{trans}$. Similarly, as the shape memory alloy 70 is heated, the temperature at which the shape memory alloy 70 begins to change from the martensite phase to the austenite phase is known as the austenite start temperature, $A_s$. The temperature at which the shape memory alloy 70 completes the change from the martensite phase to the austenite phase is known as the austenite finish temperature, $A_f$, or transformation temperature, $T_{trans}$.

The shape memory alloy 70 may have any suitable form, i.e., shape. For example, the shape memory alloy 70 may be configured as a shape-changing element such as a wire, spring, first resilient member, tape, band, continuous loop, and combinations thereof. Further, the shape memory alloy 70 may have any suitable composition. In particular, the shape memory alloy 70 may include in combination an element selected from the group of cobalt, nickel, titanium, indium, manganese, iron, palladium, zinc, copper, silver, gold, cadmium, tin, silicon, platinum, and gallium. For example, suitable shape memory alloys 70 may include nickel-titanium based alloys, nickel-aluminum based alloys, nickel-gallium based alloys, indium-titanium based alloys, indium-cadmium based alloys, nickel-cobalt-aluminum based alloys, nickel-manganese-gallium based alloys, copper based alloys (e.g., copper-zinc alloys, copper-aluminum alloys, copper-gold alloys, and copper-tin alloys), gold-cadmium based alloys, silver-cadmium based alloys, manganese-copper based alloys, iron-platinum based alloys, iron-palladium based alloys, and combinations of one or more of each of these combinations. The shape memory alloy 70 can be binary, ternary, or any higher order so long as the shape memory alloy 70 exhibits a shape memory effect, e.g., a change in shape orientation, damping capacity, and the like. Generally, the shape memory alloy 70 may be selected according to desired operating temperatures of the device 10, washer system 12, and valve manifold 14. In one specific example, the shape memory alloy 70 may include nickel and titanium.

Therefore, in one non-limiting example, each of the plurality of actuators 60, i.e., the shape memory alloy 70, may be configured as a wire 170. The wire 170 formed from the shape memory alloy 70 may be characterized by the first state 72 (FIG. 2), i.e., when a temperature of the shape memory alloy 70 is below the martensite finish temperature, $M_f$, or transformation temperature, $T_{trans}$, of the shape memory alloy 70. Likewise, the wire 170 formed from the shape memory alloy 70 may also be characterized by the second state (not shown), i.e., when the temperature of the shape memory alloy 70 is above the austenite finish temperature, $A_f$, or transformation temperature, $T_{trans}$, of the shape memory alloy 70. In addition, although not shown, the device 10, washer system 12, and/or valve manifold 14 may include a plurality of shape memory alloys 70 and/or a plurality of wires 170. Further, each of the plurality of actuators 60 may not contact the fluid 22. That is, each of the plurality of actuators 60 may not be disposed in and/or surrounded by the fluid 22.

Therefore, for embodiments in which each of the plurality of actuators 60 is configured as a wire 170, the wire 170 may contract in length in response to the thermal activation signal 76 to translate a respective one of the plurality of linkages 58, concurrently rotate one of the plurality of pins 46, and thereby translate the respective one of the plurality of poppets towards or away from the sealing face 34. In another non-limiting example, each of the plurality of actuators 60 may be configured as a first resilient member or coil spring (not shown) that compresses in response to the thermal activation signal 76 to translate a respective one of the plurality of linkages 58, concurrently rotate a respective one of the plurality of pins 46, and thereby translate the respective one of the plurality of poppets 36 towards or away from the sealing face 34.

Referring again to FIGS. 1 and 3, the valve manifold 14 may further include a plurality of second resilient members 80, e.g., a plurality of springs. Each of the plurality of second resilient members 80 may be coiled about the first end 52 (FIG. 3) of a respective one of the plurality of poppets 36 and disposed within the respective one of the plurality of outlet ports 24. Further each of the plurality of second resilient members 80 may be configured for translating the respective one of the plurality of poppets 36 between the closed position 42 (FIGS. 2 and 4B), i.e., in which the respective one of the plurality of poppets 36 is disposed against the sealing face 34, and the open position 44 (FIGS. 2 and 4C), i.e., in which the respective one of the plurality of poppets 36 is spaced apart from the sealing face 34. That is, the second resilient member 80 may be configured for translating the poppet 36 from the closed position 42 to the open position 44 or from the open position 44 to the closed position 42. In particular, the second resilient member 80 may be configured for translating a respective one of the plurality of poppets 36 between the open position 44 and the closed position 42 as the shape memory alloy 70 cools.

For example, the second resilient member 80 may be attached to the first end 52, and the actuator 60 may be attached to the second end 54. As such, the second resilient member 80 may return the poppet 36 to a default or starting position 42, 44, i.e., may bias the poppet 36 to the open or closed position 44, 42, when the thermal activation signal 76 (FIG. 3) is removed from the shape memory alloy 70. Therefore, it is to be appreciated that either the open position 44 or the closed position 42 may be characterized as a starting or default position. That is, each of the plurality of poppets 36 may be characterized as normally-closed or normally-open.

As described with continued reference to FIG. 1, the washer system 12 also includes only one pump 82 configured for transmitting the fluid 22 under pressure from the reservoir 26 to the inlet port 30. The only one pump 82 may deliver the fluid 22 from the inlet port 30 to one or more of the plurality of outlet ports 24 depending on which device components 18, 20 require washing. As such, the washer system 12 may minimize manufacturing complexity and packaging space.

Although not shown, the washer system 12 may also further include a first output line or conduit disposed in fluid communication with one of the plurality of outlet ports 24. Likewise, the washer system 12 may also include a second output line or conduit disposed in fluid communication with another of the plurality of outlet ports 24.

Moreover, as described with reference to FIG. 1, the washer system 12 may include a plurality of nozzles 84 each protruding from the housing 32 and disposed in fluid communication with a respective one of the plurality of outlet ports 24. Each of the plurality of nozzles 84 may be configured for spraying the fluid 22 onto the first component 18 or the second component 20. For example, the device 10 may include a first nozzle 184 disposed in fluid communication with one of the plurality of outlet ports 24 and configured for spraying the fluid 22 onto the first component 18. Likewise, the device 10 may include a second nozzle 284 disposed in fluid communication with another of the plurality of outlet ports 24 and configured for spraying the fluid onto the second component 20.

Therefore, during operation of the washer system 12 and valve manifold 14, the shape memory alloy 70 may transition from the first state 72 (FIG. 2) to the second state (not shown) in response to the thermal activation signal 76, e.g., Joule heating, to translate one of the plurality of poppets 36 from the closed position 42 to the open position 44 such that, e.g., the first nozzle 184 sprays the fluid 22 onto the first component 18. Conversely, when the thermal activation signal 76 is removed from the shape memory alloy 70, the shape memory alloy 70 may cool and transition from the second state (not shown) to the first state 72 (FIG. 2) so that the second resilient member 80 or coil spring, i.e., the return spring, translates the poppet 36 from the open position 44 to the closed position 42 such that the first nozzle 184 does not spray the fluid 22 onto the first component 18.

Alternatively, during operation of the washer system 12 and valve manifold 14, the shape memory alloy 70 may transition from the first state 72 (FIG. 2) to the second state (not shown) in response to the thermal activation signal 76, e.g., Joule heating, to translate one of the plurality of poppets 36 from the open position 44 to the closed position 42 such that, e.g., the first nozzle 184 does not spray the fluid 22 onto the first component 18. Conversely, when the thermal activation signal 76 is removed from the shape memory alloy 70, the shape memory alloy 70 may cool and transition from the second state (not shown) to the first state 72 (FIG. 2) so that the second resilient member 80 or coil spring, i.e., the return spring, translates the poppet 36 from the closed position 42 to the open position 44 such that the first nozzle 184 sprays the fluid 22 onto the first component 18.

In addition, more than one shape memory alloy 70 or actuator 60 may actuate several respective poppets 36 simultaneously. That is, one poppet 36 may translate to the closed position 42 based on an activation of the shape memory alloy 70 while one or more other poppets 36 translate to the open position 42. As such, multiple portions or components 18, 20 of the device 10 may be washed simultaneously from a single pump 82, reservoir 26, and inlet port 30.

Therefore, for embodiments which include more than two outlet ports 24, the valve manifold 14 may also provide fluid 22 to more than one portion or component of the device 10 other than the first component 18. For example, for embodiments including three outlet ports (not shown), the valve manifold 14 and washer system 12 may simultaneously provide the fluid 22 to the first component 18 and the second component 20, e.g., to both the rear liftgate window and a lens of a camera of the device 10 at the same time. That is, two of the plurality of actuators 60 may simultaneously actuate a respective two of the plurality of poppets 36. More specifically, the shape memory alloy 70 may transition between the first state 72 and the second state in response to the thermal activation signal 76 to actuate one of the plurality of poppets 36 and another one of the plurality of poppets 36 so that one of the plurality of poppets 36 and the other one of the plurality of poppets 36 are both disposed in the open position 44 in which the one of the plurality of poppets 36 and the other one of the plurality of poppets 36 are spaced apart from the sealing face 34 to thereby simultaneously wash the first component 18 and the second component 20.

Alternately, the valve manifold 14 may also only provide fluid 22 to one of the plurality of outlet ports 24 at a time. That is, one of the plurality of poppets 36 may be disposed in the open position 44, while one or more other ones of the plurality of poppets 36 may be disposed in the closed position 42.

Referring now to FIG. 5, the method 16 of controlling fluid flow to the first component 18 of the device 10 and the second component 20 of the device 10 includes applying 86 the thermal activation signal 76 (FIG. 3) to the plurality of actuators 60 to thereby actuate the plurality of actuators 60. Concurrent to applying 86, the method 16 includes translating 88 the plurality of poppets 36 towards or away from the sealing face 34 defined by the respective ones of the plurality of outlet ports 24 to thereby simultaneously control fluid flow to the first component 18 and the second component 20.

Therefore, the device 10, washer system 12, valve manifold 14, and/or method 16 may provide a shape memory alloy-controlled, on-demand valve system that is capable of switching fluid supply between the plurality of outlet ports 24, and providing fluid supply from more than one outlet port 24 simultaneously. Such switching may be useful for applications requiring alternately washing the first component 18 and the second component 20 of the device 10 while minimizing fluid leaks from the first nozzle 184 and second nozzle 284. In addition, normally-closed output ports 24 and normally-open output ports 24 may be easily assembled and may share common components. For example, the plurality of linkages 58 may simply be reversed in configuration for a normally-closed output port 24 as compared to a normally-open output port 24. Therefore, the washer system 12 and valve manifold 14 may contribute to decreased device manufacturing costs. Further, the washer system 12 and valve manifold 14 may be lightweight and economically sized, and may minimize the number of pumps 82 or other components required for multi-outlet port 24 applications, which may in turn optimize a volume of the cavity 28 and reservoir 26. Therefore, the washer system 12 and valve manifold 14 may provide an economical and compact alternative to multi-pump systems.

While the best modes for carrying out the disclosure have been described in detail, those familiar with the art to which this disclosure relates will recognize various alternative designs and embodiments for practicing the disclosure within the scope of the appended claims.

The invention claimed is:

1. A valve manifold comprising:
   a housing defining an inlet port and a plurality of outlet ports, wherein each of the plurality of outlet ports defines a sealing face;
   a plurality of poppets, wherein each of the plurality of poppets is disposed within a respective one of the plurality of outlet ports and is configured for translating towards and away from the sealing face;
   a plurality of pins, wherein each of the plurality of pins protrudes from a respective one of the plurality of poppets;
   wherein each of the plurality of pins protrudes from the housing and is rotatable with respect to the housing; and
   a plurality of actuators each configured for translating a respective one of the plurality of poppets towards and away from the sealing face, wherein each of the plurality of actuators is formed from a shape memory alloy transitionable between a first state and a second state in response to a thermal activation signal.

2. The valve manifold of claim 1, further including a plurality of first o-ring seals each surrounding a respective one of the plurality of pins and configured for sealing the respective one of the plurality of pins against the housing.

3. The valve manifold of claim 1, further including a plurality of linkages, wherein each of the plurality of linkages is connected to a respective one of the plurality of pins and a respective one of the plurality of actuators.

4. The valve manifold of claim 3, wherein the shape memory alloy transitions between the first state and the second state to translate a respective one of the plurality of poppets towards and away from the sealing face.

5. The valve manifold of claim 3, wherein each of the plurality of actuators is configured as a wire that contracts in length in response to the thermal activation signal to translate a respective one of the plurality of linkages, concurrently rotate a respective one of the plurality of pins, and thereby translate the respective one of the plurality of poppets towards or away from the sealing face.

6. The valve manifold of claim 3, wherein each of the plurality of actuators is configured as a first resilient member that compresses in response to the thermal activation signal to translate a respective one of the plurality of linkages, concurrently rotate a respective one of the plurality of pins, and thereby translate the respective one of the plurality of poppets towards or away from the sealing face.

7. The valve manifold of claim 1, wherein each of the plurality of poppets has a first end and a second end spaced apart from the first end, and further wherein the valve manifold further includes a plurality of second o-ring seals each disposed on the first end of a respective one of the plurality of poppets and configured for sealing the first end against the sealing face.

8. The valve manifold of claim 7, further including a plurality of second resilient members, wherein each of the plurality of second resilient members is coiled about the first end of a respective one of the plurality of poppets and is configured for translating the respective one of the plurality of poppets between:
   a closed position in which the respective one of the plurality of poppets is disposed against the sealing face; and
   an open position in which the respective one of the plurality of poppets is spaced apart from the sealing face.

9. The valve manifold of claim 8, wherein each of the plurality of second resilient members is configured for translating the respective one of the plurality of poppets between the open position and the closed position as the shape memory alloy cools.

10. A washer system comprising:
    a reservoir defining a cavity and configured for storing a fluid within the cavity;
    a valve manifold including:
       a housing defining an inlet port and a plurality of outlet ports, wherein each of the plurality of outlet ports defines a sealing face;
       a plurality of poppets, wherein each of the plurality of poppets is disposed within a respective one of the plurality of outlet ports and is configured for translating towards and away from the sealing face; and
       a plurality of actuators each configured for translating a respective one of the plurality of poppets towards and away from the sealing face, wherein each of the plurality of actuators is formed from a shape memory alloy transitionable between a first state and a second state in response to a thermal activation signal; and
    only one pump configured for transmitting the fluid under pressure from the reservoir to the inlet port.

11. The washer system of claim 10, further including a plurality of nozzles each protruding from the housing and disposed in fluid communication with a respective one of the plurality of outlet ports.

12. The washer system of claim 10, wherein each of the plurality of actuators does not contact the fluid.

13. A device comprising:
    a first component;
    a second component spaced apart from the first component and exposed to debris;
    a washer system configured for both selectively washing only one of the first component and the second component, and for washing both of the first component and the second component simultaneously, the washer system including:
       a reservoir defining a cavity and configured for storing a fluid within the cavity;
       a valve manifold including:
          a housing defining an inlet port and a plurality of outlet ports, wherein each of the plurality of outlet ports defines a sealing face;
          a plurality of poppets, wherein each of the plurality of poppets is disposed within a respective one of the plurality of outlet ports and is configured for translating towards and away from the sealing face; and
          a plurality of actuators each configured for translating a respective one of the plurality of poppets towards and away from the sealing face, wherein each of the plurality of actuators is formed from a shape memory alloy transitionable between a first state and a second state in response to a thermal activation signal; and
       only one pump configured for transmitting the fluid under pressure from the reservoir to the inlet port;
    a first nozzle disposed in fluid communication with one of the plurality of outlet ports and configured for spraying the fluid onto the first component; and a second nozzle disposed in fluid communication with another of the plurality of outlet ports and configured for spraying the fluid onto the second component.

14. The device of claim 13, wherein the valve manifold includes at least four outlet ports.

15. The device of claim 14, wherein two of the plurality of actuators simultaneously actuate a respective two of the plurality of poppets.

16. The device of claim 15, wherein the shape memory alloy transitions between the first state and the second state in response to the thermal activation signal to actuate one of the plurality of poppets and another one of the plurality of poppets so that the one of the plurality of poppets and the other one of the plurality of poppets are both disposed in an open position in which the one of the plurality of poppets and the other one of the plurality of poppets are spaced apart from the sealing face to thereby simultaneously wash the first component and the second component.

* * * * *